US 7,254,148 B2

(12) United States Patent
Masuda

(10) Patent No.: US 7,254,148 B2
(45) Date of Patent: Aug. 7, 2007

(54) LASER LIGHT GENERATING DEVICE AND METHOD OF FABRICATING THE SAME

(75) Inventor: Hisashi Masuda, Tokyo (JP)

(73) Assignee: Sony Corporation (JP)

( * ) Notice: Subject to any disclaimer, the term of this patent is extended or adjusted under 35 U.S.C. 154(b) by 211 days.

(21) Appl. No.: 10/496,296

(22) PCT Filed: Sep. 25, 2003

(86) PCT No.: PCT/JP03/12233

§ 371 (c)(1),
(2), (4) Date: Dec. 21, 2004

(87) PCT Pub. No.: WO2004/032293

PCT Pub. Date: Apr. 15, 2004

(65) Prior Publication Data

US 2005/0078719 A1 Apr. 14, 2005

(30) Foreign Application Priority Data

Oct. 1, 2002 (JP) ............................. 2002-288765

(51) Int. Cl.
*H01S 3/13* (2006.01)
(52) U.S. Cl. .................................. 372/29.02
(58) Field of Classification Search ............. 372/29.02
See application file for complete search history.

(56) References Cited

U.S. PATENT DOCUMENTS 5,315,433 A 5/1994 Okazaki et al.
5,333,145 A 7/1994 Hyuga et al.

(Continued)

FOREIGN PATENT DOCUMENTS

EP 0 508 406 A2 4/1992

(Continued)

OTHER PUBLICATIONS

EPO Search Report mailed Nov. 25, 2005.

(Continued)

*Primary Examiner*—Dung (Michael) T. Nguyen
(74) *Attorney, Agent, or Firm*—Rader Fishman & Grauer PLLC; Ronald P. Kananen

(57) ABSTRACT

In a laser light generating device, the stability against vibration and time-dependent changes will be improved, and influences of temperature changes exerted on the resonator will be reduced. In a laser light generating device (1) which includes an excitation light source (2) for generating a continuous-wave excitation light and a solid-state laser resonator (4) based on using thermal lens effect caused by heat generation at a position of excitation, the solid-state laser resonator further includes a laser medium (4a) a saturable absorber (4b) an intermediate medium (4c) and reflection means (4d) as the constituents. Influence of vibration is reduced by bonding a substrate of the laser medium (4a) and a substrate of the saturable absorber (4b) so as to integrate them. By adopting a configuration which does not need any method of selecting operating point based on temperature changes and is less susceptible to heat, and by relatively moving the excitation optical system and the resonator in the positional relation of the both to thereby adjust the light path length of the resonator, so as to make it possible to select a stable operating point.

26 Claims, 9 Drawing Sheets

U.S. PATENT DOCUMENTS

| | | |
|---|---|---|
| 5,394,413 A | 2/1995 | Zayhowski |
| 5,436,920 A | 7/1995 | Minemoto et al. |
| 5,832,010 A | 11/1998 | Fulbert et al. |

FOREIGN PATENT DOCUMENTS

| | | |
|---|---|---|
| EP | 0 508 406 | 10/1992 |
| JP | 57-55969 | 9/1955 |
| JP | 59-123287 | 7/1984 |
| JP | 1-152781 | 6/1989 |
| JP | 5-211363 | 8/1993 |
| JP | 5-235457 | 9/1993 |
| JP | 6-69568 | 3/1994 |
| JP | 6-177465 | 6/1994 |
| JP | 7-131102 | 5/1995 |
| JP | 11-163441 | 6/1999 |
| JP | 11-261136 | 9/1999 |
| JP | 2000-101175 | 4/2000 |

OTHER PUBLICATIONS

International Search Report Nov. 4, 2003.

IEEE Photonics Technology Letters, vol. 9, No. 6, Jun. 1997,"Single-Mode Oscillation of Compact Fiber-Coupled Laser-Diode-Pumped Nd: $YVO_4$/KTP Green Laser", Y.F. Chen, et al.

Optical Society of America, Diode-Pumped Passively Q-Switched Picosecond Microchip Lasers, Sep. 15, 1994, vol. 19, No. 18, J.J. Zayhowski et al/.

LASER LIGHT GENERATING DEVICE AND METHOD OF FABRICATING THE SAME

TECHNICAL FIELD

With respect to a laser light generating device which has a solid-state laser resonator including a laser medium, the present invention relates to a technique of facilitating fine adjustment in the assembly, stabilizing the characteristics, improving the vibration resistance, and making it less susceptible to the environment and time-dependent changes.

BACKGROUND ART

Passive Q-switched or mode-locked pulse light source based on continuous-wave excitation has a configuration that includes a laser medium (Nd:YVO$_4$, etc.) and a saturable absorber. In particular for the case where a short pulse is required or a higher recurrence frequency is desired, both are often used in contact with each other in order to shorten the resonator length (see Patent Document 1, for example).

Referring now to a small-sized pulsed laser which is constituted of a laser medium and a saturable absorber, the resonator length can be shortened and stabilized by thinning the device thickness through use of a semiconductor saturable absorber such as SESAM (semiconductor saturable absorber mirror) or SBR (saturable Bragg reflector), and this is preferable for the case where a higher recurrence frequency is desired or a shorter pulse is preferred. This sort of laser resonator is usually configured using a pair of flat mirrors having no curvature, and formed as a stable resonator making use of thermal lens effect within the laser medium.

FIG. 8 is a graph which exemplifies an excitation light power dependence of lens focal length based on the thermal lens effect, where a relation between both is expressed while plotting input power "$P_{in}$" (unit: W) on the abscissa, and focal length "f" (unit: mm) on the ordinate.

As illustrated in the figure, decreasing trend of f with increase in $P_{in}$ can be found.

A resonator using the thermal lens effect based on temperature dependence of the refractive index can be formed by making use of temperature rise at around the excitation center, which is ascribable to conversion of non-oscillating energy to phonon or re-absorption of light as by-products of absorption of the excitation light at an irradiated region of the excitation light.

FIG. 9 is a graph which exemplifies a profile of temperature rise in the radial direction of the laser medium (Nd:YVO$_4$) caused by the excitation light, where a relation between the both is expressed while plotting the radius "r" (unit: mm) assuming the excitation center as a reference position on the abscissa, and plotting relative temperature change "□T" (unit: K) assuming temperature at r=0 as a reference temperature on the ordinate (temperature decreases in the direction from the excitation center portion towards the peripheral portion).

It is found that the excitation light of approximately 1 W condensed in the laser medium results in a temperature rise of approximately 200 K at the excitation center portion (r=0).

Such temperature rise may elevate temperature of the saturable absorber disposed in close contact with the laser medium and may undesirably vary the characteristics thereof, and this consequently makes it difficult to increase the output. In short, influence of heat or a high-temperature region generated in the laser medium to the saturable absorber may become a problem.

To avoid this problem, there is known a configuration in which an air layer or an intermediate layer is disposed between the laser medium and saturable absorber (see Patent Documents 2, 3 and 4, for example), and this makes it possible to reduce thermal influence (degree of heat conduction) of temperature rise of the laser medium exerted on the saturable absorber.

FIG. 10 schematically shows an example of this type of configuration "a", in which the laser medium and saturable absorber are disposed in a separated manner.

An excitation light emitted from an excitation light source "b" advances through an optical system "c" to reach a substrate "d" and irradiate a laser medium "e".

A saturable absorber "f" opposed to the laser medium "e" is formed on a substrate "g", and a gap "h" is formed between the laser medium "e" and saturable absorber "f" so that air can exist therebetween. The opposing planes of the laser medium "e" and saturable absorber "f" are kept in parallel, and this allows variation in the resonator length (light path length) through adjustment of the length of the gap "h".

Patent Document 1: Japanese Patent Application Publication No. 2001-185794 (p. 4-7, FIGS. 1 and 7);

Patent Document 2: Japanese Patent Application Publication No. 2000-101175 (p. 7-8, FIG. 4);

Patent Document 3: Japanese Patent Application Publication No. 2001-358394 (p. 3-5, FIGS. 1, 3 to 5); and Patent Document 4: Japanese Patent Application Publication No. 11-261136 (p. 6-8, FIGS. 1 and 2).

The above-described configuration, however, suffers from a problem of degradation of stability due to vibration and time-dependent changes.

In the configuration having the laser medium and saturable absorber individually fixed on the independent substrates, a change in the resonator length of as much as approximately one-fourth of the oscillation wavelength due to vibration or expansion of an adhesive under temperature change can vary the effective gain due to changes in the oscillation wavelength and relative position of gain spectrum, and this considerably varies the characteristics such as output and pulse recurrence frequency. This configuration also tends to be readily affected by mechanical vibration and causes the jitter to increase, and is associated with a problem that only a small change in the resonator length due to time-dependent changes may result in a large variation in the operating point such as output and pulse recurrence frequency (degradation in the stability).

The configuration having an intermediate matter such as a spacer or shim disposed between the laser medium and saturable absorber is successful in avoiding direct heat transfer from the laser medium towards the saturable absorber, but the heat transfer via the intermediate matter towards the saturable absorber raises another problem of temperature rise of the laser medium or saturable absorber which generally have only a small heat transfer coefficient. Necessity of using a thin spacer also raises a problem (infiltration, etc.) caused by surface tension of the adhesive during adhesion, and raises difficulty in the fabrication.

It is therefore a subject of the present invention to improve, with respect to a laser light generating device, the stability against vibration and time dependent changes, and to reduce influences of temperature changes on the resonator.

DISCLOSURE OF THE INVENTION

To solve the aforementioned subject, the present invention relates to a laser light generating device including an excitation light source of a continuous-wave and a solid-state laser resonator based on using thermal lens effect available at a position of excitation in a laser medium, which is characterized by having the following features:

the solid-state laser resonator is configured so that the individual substrates having the individual constituents of the solid-state laser resonator disposed thereon are integrated by bonding, and so that a reflection means or a saturable absorber of the solid-state laser resonator is opposed with the laser medium while placing an intermediate medium in between; and the constituent of the solid-state laser resonator has an interface inclined from a plane orthogonal to the optical axis of the excitation light, and the light path length of the solid-state resonator in the direction parallel to the optical axis of the excitation light differs depending on setting of the position of excitation. That is, the light path length of the resonator can be specified or can be adjusted depending on the setting of the position of excitation in the direction orthogonal to the optical axis of the excitation light.

Therefore according to the present invention, changes in the light path length of the resonator is less susceptible to vibration or the like, as compared with a configuration in which the substrates individually having each constituent of the solid-state laser resonator disposed thereon are supported in an independent manner. It is also made possible to select an operating point which is stable in terms of the characteristics, by adjusting the light path length of the resonator through varying the position of excitation within the laser medium.

BEST MODES FOR CARRYING OUT THE INVENTION

The present invention relates to a solid-state laser resonator based on using thermal lens effect caused by irradiation of continuous-wave excitation light, and a laser light generating device equipped with such resonator, which is available as a light source for display devices (two-dimensional image display device) using GLV (grating light valve) or the like as a linear optical modulation element.

Figure 1:
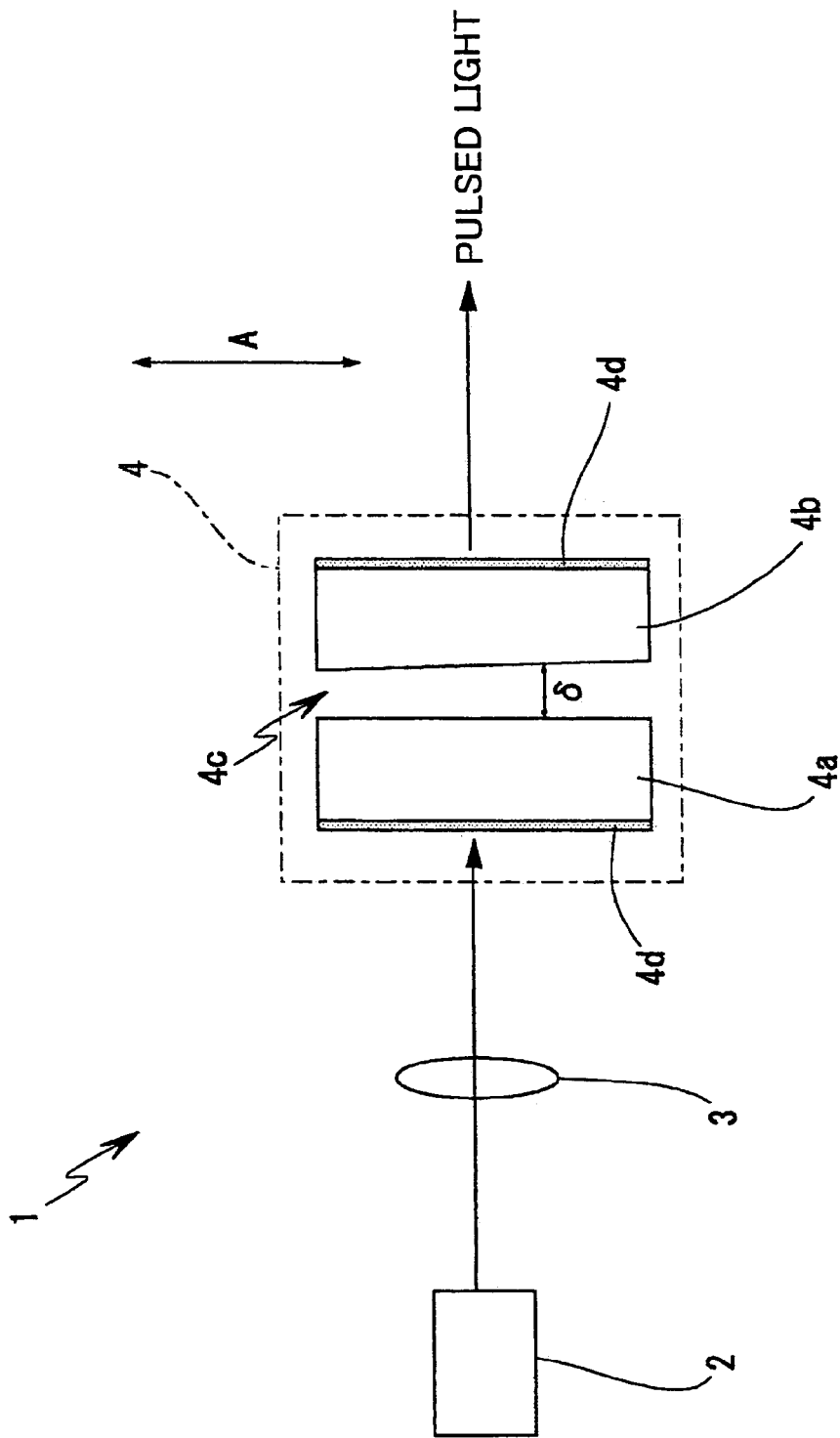
FIG. 1 is a schematic drawing of an exemplary basic configuration of a laser light generating device according to the present invention.

FIG. 1 is a schematic drawing of an exemplary basic configuration of a laser light generating device according to the present invention, assumed as being applied to a passive Q-switched laser.

A laser light generating device 1 has an excitation light source 2 for generating continuous-wave excitation light, and the excitation light from the excitation light source 2 is radiated through an optical system 3 (simplified as a single lens in the drawing) to a solid-state laser resonator 4. As the excitation light source 2 herein, a semiconductor laser (laser diode) which is advantageous in downsizing the device is available. The optical system 3 (condensing optical system) disposed between the excitation light source 2 and solid-state laser resonator 4 is configured as an approximately equal-magnification optical system, or as a reduced-magnification optical system for the purpose of converging the light from the excitation light source 2.

The solid-state laser resonator 4 has a laser medium 4a for absorbing the light from the excitation light source 2 and a saturable absorber 4b, in which a resonator is formed based on using thermal lens effect caused by heat generation at a position of excitation in the laser medium 4a.

On the light path between the laser medium 4a and saturable absorber 4b, an intermediate medium 4c is disposed, which is typified by a gas layer (air layer, etc.) having a refraction of approximately 1. The intermediate medium 4c configured as a solid may cause a problem (problem of heat transfer influence, etc.) similar to that arisen in the embodiment in which the spacer is disposed between the laser medium 4a and saturable absorber 4b, and a liquid medium is difficult to handle, so that the intermediate medium 4c is preferably a gas, and is more preferably air considering influences of the refractive index and simplification of the configuration.

As reflection means 4d for forming the resonator (optical resonator), a reflective surface, coating film and the like formed on the laser medium 4a and saturable absorber 4b are available.

As for pulsed light output from the resonator, the wavelength "$\lambda$" thereof is specified within a range from $700 \leq \lambda \leq 1600$ (unit nm: nanometer) considering taking a typical range of oscillation wavelength of the solid-state laser. However the applicable range of the present invention is by no means limited to only the above-described wavelength range.

With respect to a temperature adjusting means for the excitation light source and resonator, possible configurations include such as disposing an electronic temperature adjusting instrument composed of Peltier element or other types of temperature control elements, and such as excluding this sort of means in order to save the cost.

Alternatively, in order to obtain the continuous-wave laser output, another possible configuration is such as superposing the intermediate medium 4c between the laser medium 4a and the opposing reflection means 4d, without disposing the saturable absorber 4b shown in FIG. 1. It is also possible to generate harmonic wave by replacing the saturable absorber 4b with a non-linear optical crystal.

The present invention makes it possible to select and set a stable operating point through adjustment of the resonator light path length, because the resonator light path length in the direction parallel to the optical axis of the excitation light is not kept constant as described later, and instead the resonator light path length varies in the direction orthogonal to the optical axis of the excitation light.

Because the configuration having the laser medium 4a and saturable absorber 4b individually fixed on the independent substrates is likely to be affected by vibration or the like, the present invention adopts a configuration in which the substrate having the laser medium 4a disposed thereon and the substrate having the saturable absorber 4b (or the reflection means 4d) disposed thereon are integrated by bonding, so that the laser medium and saturable absorber are opposed with each other while placing an intermediate medium in between. Possible modes include the followings:

(I) a mode in which the substrate of the saturable absorber is bonded to the substrate of the laser medium in a portion of the laser medium; and (II) a mode in which the substrate of the saturable absorber is bonded to the substrate of the laser medium in a portion having no laser medium formed therein.

Figure 2:
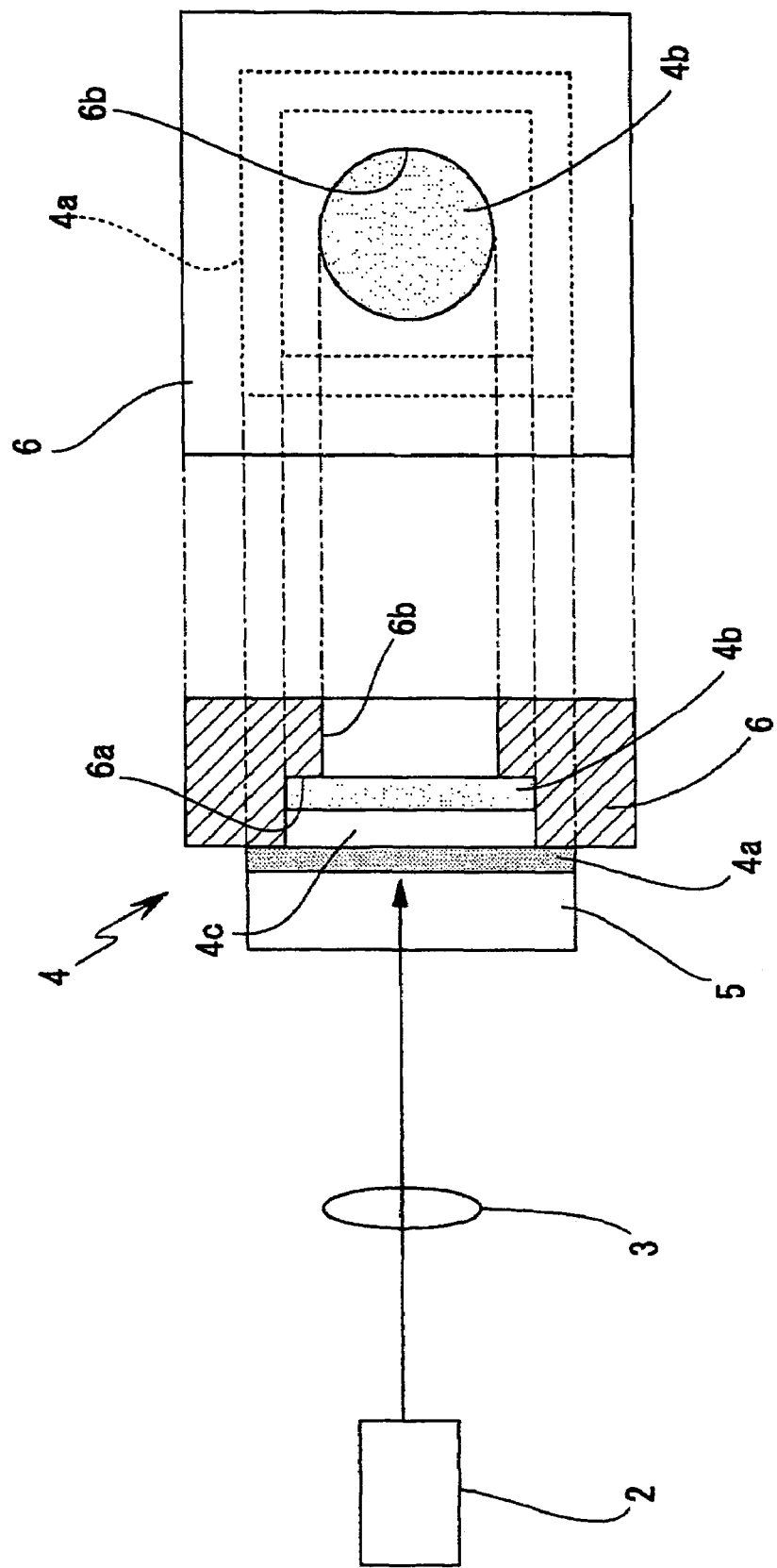
FIG. 2 is a drawing, in cooperation with FIG. 3, of an exemplary configuration of a laser light generating device, showing an excitation optical system and a solid-state laser resonator.
Figure 3:
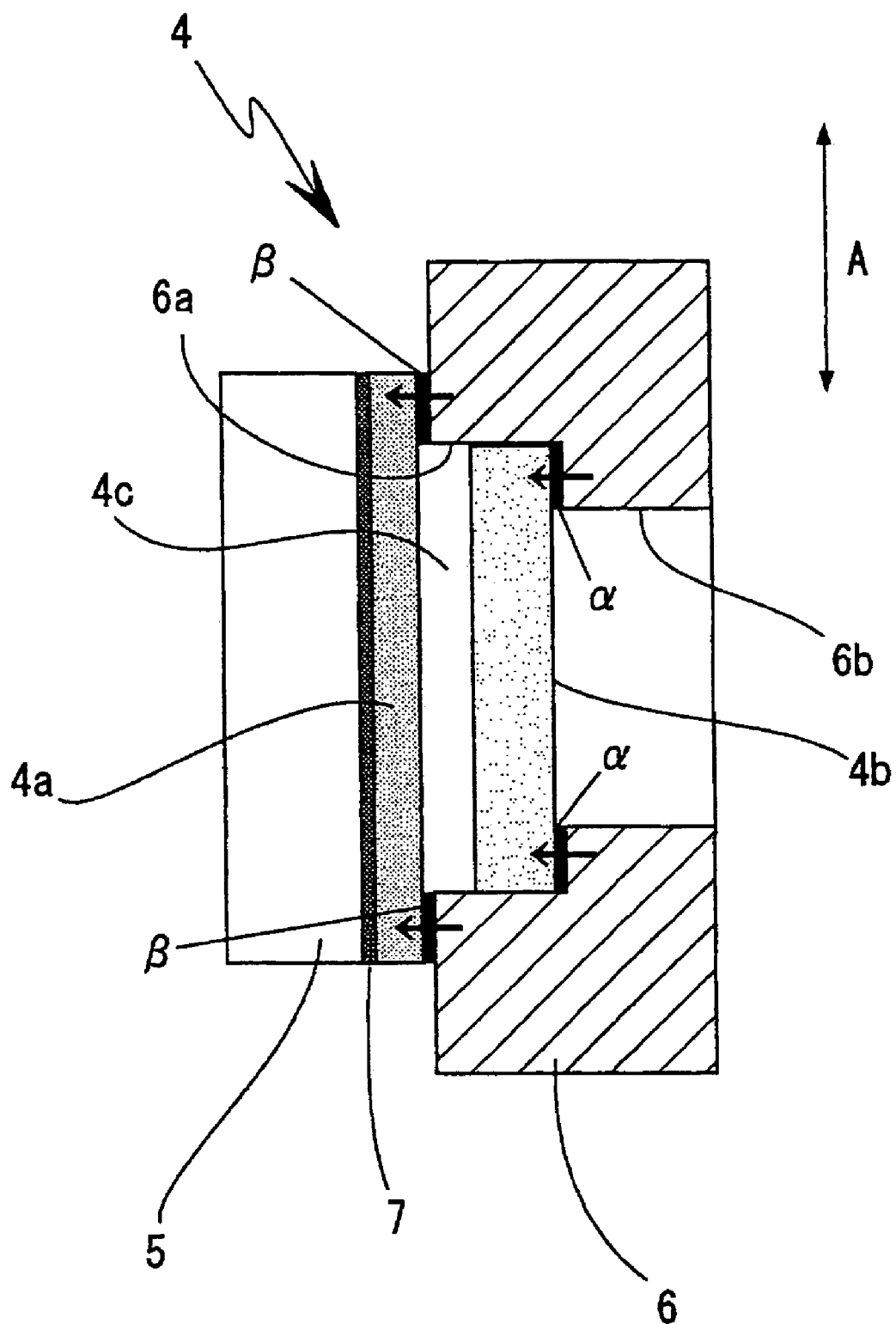
FIG. 3 is a drawing schematically showing an exemplary configuration of a solid-state laser resonator.

FIGS. 2 and 3 are drawings showing an exemplary configuration of the solid-state laser resonator 4 according to mode (I).

FIG. 2 shows a sectional structure of the resonator at the center, and a view taken in the direction of the optical axis (a drawing as viewed from the saturable absorber side) on the right hand side.

A substrate 5 is a plate-like supporting substrate for supporting the laser medium 4a, and on one surface of which (the surface opposite to the incident plane of the excitation light) the laser medium 4a is disposed.

A substrate 6 is a supporting substrate for supporting the saturable absorber 4b, and formed as a rectangular plate having a recess 6a. The saturable absorber 4b is fixed by adhesion as being accepted in the recess 6a. At the center of the substrate 6, a hole 6b (round hole in this example) which communicates with the recess 6a is formed, where such hole is also omissible in another configuration.

The substrates 5, 6 are configured using a transparent base (quartz, sapphire, etc.), where it is preferable to use a material having a larger heat transfer coefficient as compared with that of the laser medium and saturable absorber. Because the substrates 5, 6 are used as being fixed to a supporting member not shown, the attachment surface (or fixation surface) to the supporting member can serve as a heat transfer surface, and this is effective for heat dissipation of the laser medium and saturable absorber (because heat disposal is facilitated).

FIG. 3 is a drawing schematically showing an essential portion of the sectional structure of the resonator (thickness or the like is shown in an emphasized manner).

The laser medium 4a disposed on the substrate 5 is composed of a solid-state laser medium doped (implanted) with rare earth elements (Nd:YVO$_4$, Nd:YAG (Y$_3$A$_{15}$O$_{12}$), etc. doped with neodymium Nd$^{3+}$), and on the incident surface side of which a mirror 7 is formed using a dielectric multi-layered film or the like, and the on the side opposite to the mirror 7 (on the saturable absorber side) an total-reflection (AR) coating is given.

The saturable absorber 4b is attached to the substrate 6 in such a way that the circumferential area thereof is adhered to the bottom of the recess 6a (see portion a in the drawing). Attachment of the substrate 5 including the laser medium 4a to the substrate 6 is accomplished by adhesion, where the circumferential area of the laser medium 4a and the circumferential portion of the opening edge of the recess 6a are adhered (see portion β in the drawing).

Thus-integrated solid-state laser resonator (or resonator assembly) 4 has a gas layer having a refractive index of approximately 1, and preferably an air layer disposed between the laser medium 4a and saturable absorber 4b.

In view of downsizing, the saturable absorber 4b is preferably composed of a semiconductor saturable absorber (SESAM, SBR, etc.). For the case where the saturable absorber 4b is configured as an SBR (saturable Bragg reflector) having quantum wells formed on a Bragg reflector, the reflective surface thereof is formed as a DBR (distributed Bragg reflector). The SBR can intake the light, which is stored in the resonator with the aid of the excitation light into the potential of the quantum well, and so that it can function as a resonator loss under unsaturated conditions, but abruptly reduces the loss and can transitionally function as a resonator gain switch once a predetermined amount of light is uptaken into the quantum well.

Figure 8:
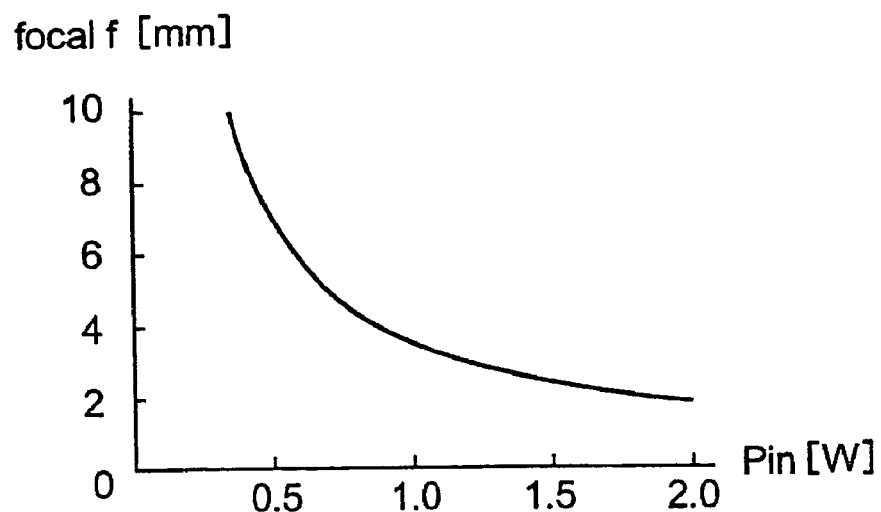
FIG. 8 is a graph typically showing excitation-light-power dependence of a lens focal length based on the thermal lens effect.

Once the excitation light emitted from the excitation light source 2 passes through from one surface of the substrate to the mirror 7 and radiates the laser medium 4a, the thermal lens is formed based on the thermal lens effect explained referring to the FIG. 8, and thereby a resonator including the laser medium and saturable absorber is formed. The resonator can output pulsed light in either mode in which the output light is emitted in the opposite direction (leftward direction in FIG. 3) to the direction of the incident excitation light (rightward direction in FIG. 3) (the output light is extracted after being changed in the light path thereof while being reflected by a dichroic mirror or the like), and in a mode in which the output light is emitted in the same direction as the direction of the incident excitation light after passing through the saturable absorber.

In the present invention, the light path length of the solid-state laser resonator have a continuous distribution along the direction orthogonal to the optical axis of the excitation light. It is to be noted that the "light path length" herein is defined as a sum of quantity which equals to a refractive index at the laser oscillation wavelength λ multiplied by the a physical length (geometrical length), where the light path length of the resonator will be denoted as "L", and its variation as "ΔL", hereinafter.

In an exemplary case shown in FIG. 3, the resonator is formed by the mirror 7, position of excitation within the laser medium 4a (position of heat generation upon irradiation by the excitation light), the intermediate medium 4c (air layer) and the saturable absorber 4b, all of which being arranged along the optical axis of the excitation light, where the light path length of the resonator varies along the direction (indicated by arrow "A") normal to the optical axis. In other words, relative displacement of the optical axis of the excitation light in the direction indicated by arrow "A" varies the light path length of the resonator corresponding to the change in the position of excitation.

Figure 4:
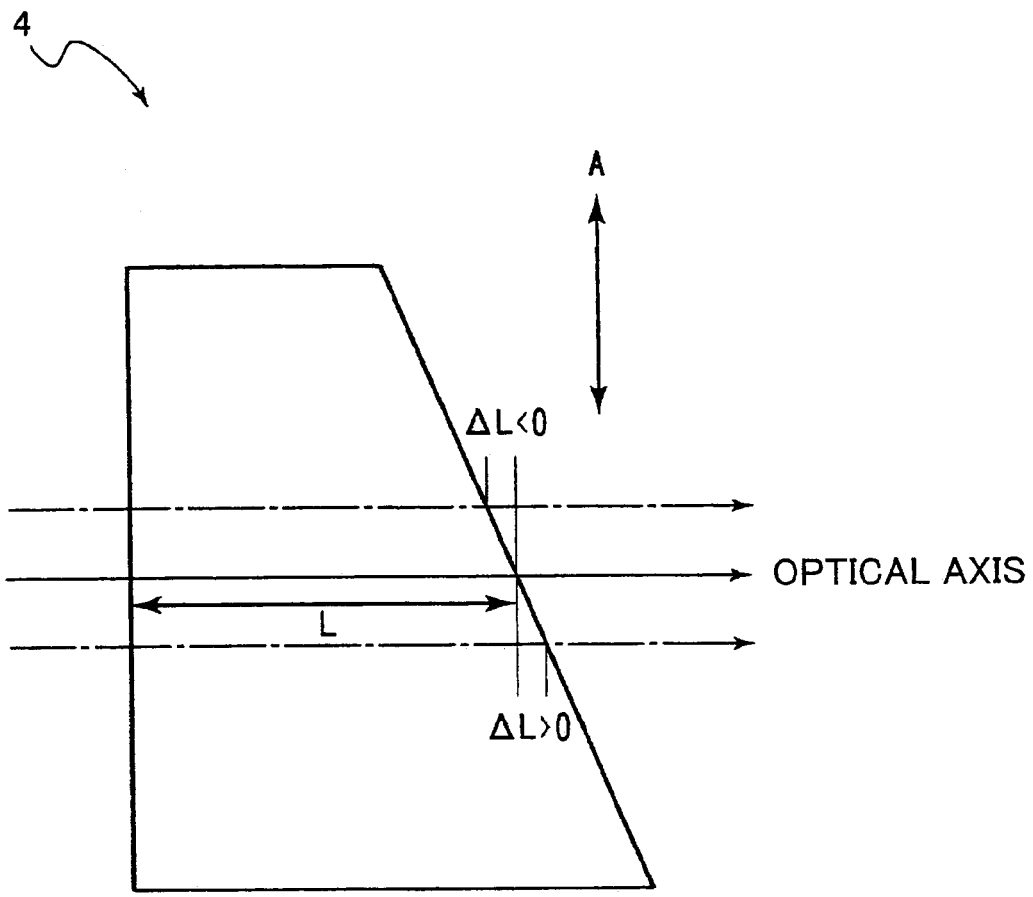
FIG. 4 is a drawing for explaining light path length of a resonator.

FIG. 4 is a drawing for schematically explaining the change in the light path length L, where a trapezoidal portion represents the resonator (sectional form).

The light path length L indicated in the drawing represents the light path length on the optical axis (indicated by a solid line) of the excitation light, where the light path length L becomes shorter if the optical axis is shifted in the upward direction of the drawing (indicated by arrow "A") normal to the optical axis (ΔL<0), and becomes longer if the optical axis is shifted in the downward direction of the drawing (ΔL>0). This way of positional adjustment and setting is available by changing relative positional relation between the excitation light and resonator.

The constituents of the solid-state laser resonator can be exemplified by the laser medium, saturable absorber, intermediate medium and reflection means, and the continuous variation in the light path length of the resonator can be given by inclining one of, or two or more of these constituents, or by varying the thickness thereof.

Possible modes are as follows:

(A) a mode in which the laser medium 4a and the substrate 5 thereof have planes inclined from a plane orthogonal to the optical axis of the excitation light;

(B) a mode in which the saturable absorber 4b and the substrate 6 thereof have planes inclined from a plane orthogonal to the optical axis of the excitation light;

(C) a mode in which the laser medium and the reflection means 4 attached to the saturable absorber 4b have planes inclined from a plane orthogonal to the optical axis of the excitation light; and (D) a mode in which the thickness, in the direction parallel to the optical axis, of any one of the laser medium 4a, saturable absorber 4b and intermediate medium 4c varies in the direction orthogonal to the optical axis.

First, with regard to modes (A) and (B), relatively inclined planes between the mirrors composing the resonator can be formed by adding a slight inclination to the fixation surface of the substrates or the like, or to the substrate itself. Because the laser resonator is formed based on using the thermal lens effect as described in the above, the relative shifting of the resonator with respect to the optical axis of the excitation light makes it possible to adjust the light path length of the resonator and to select an operating point.

The mode (C), in which the reflection means itself has to be added with the inclination, needs accuracy in the fabrication.

In the mode (D), the thickness of the constituents in the resonator, such as the laser medium, is varied, to thereby vary the difference in the light path length based on difference in the refractive index with that of the intermediate medium. It is also allowable to add variation in the thickness of the intermediate medium, to thereby vary the light path length of the resonator. In the latter case, it is not always necessary to incline the interface of the laser medium or saturable absorber with the intermediate medium, and or to add variation in the thickness thereof. In the exemplary case shown in FIG. 3 in which a part (circumferential area of the opening of the recess 6a) of the substrate 6 is adhered to the laser medium 4a, it is allowable to press the substrate 6 with an uneven force to the laser medium 4a for fixation thereon, instead of pressing the substrate 6 to the laser medium 4a with an even force. This results in difference in the thickness of the intermediate medium 4c between portions applied with a strong pressurizing force and a weak pressurizing force (the thickness is smaller in the portion applied with a strong pressurizing force), and consequently results in variation in the light path length L.

Other possible modes include combination of two or more of the above-described modes. It is to be noted that, of these modes, FIG. 1 shows a mode in which the thickness "δ" of the intermediate medium 4c is continuously varied in the direction indicated by arrow "A", where the variation in the thickness "δ" is expressed in an emphasized manner (actual angle of inclination is as much as several milliradians, as described later).

As described in the above, the resonator, which adopts any of the above-described modes or any combination of these modes, is configured so as to have a wedge-shaped sectional form when viewed in the plane including the optical axis of the excitation light. The light path length of the resonator can be added by a method of preliminarily adding a continuous change, or by a method of preliminarily adding a step-wise change, where the latter is limitative in terms of adjustable range and process accuracy. The former way is therefore more preferable in view of specifying the light path length of the resonator depending on setting or selection of the position of excitation.

Possible methods of adjusting the light path length of the resonator include the followings:

(1) a method of shifting the resonator relative to the excitation light;

(2) a method of shifting the excitation light relative to the resonator; and (3) a method based on a combination of (1) and (2).

The above-described method (1) refers to a method in which only the resonator is shifted in the direction orthogonal to the optical axis while keeping the positions of the excitation light source 2 and optical system 3 unshifted.

Figure 5:
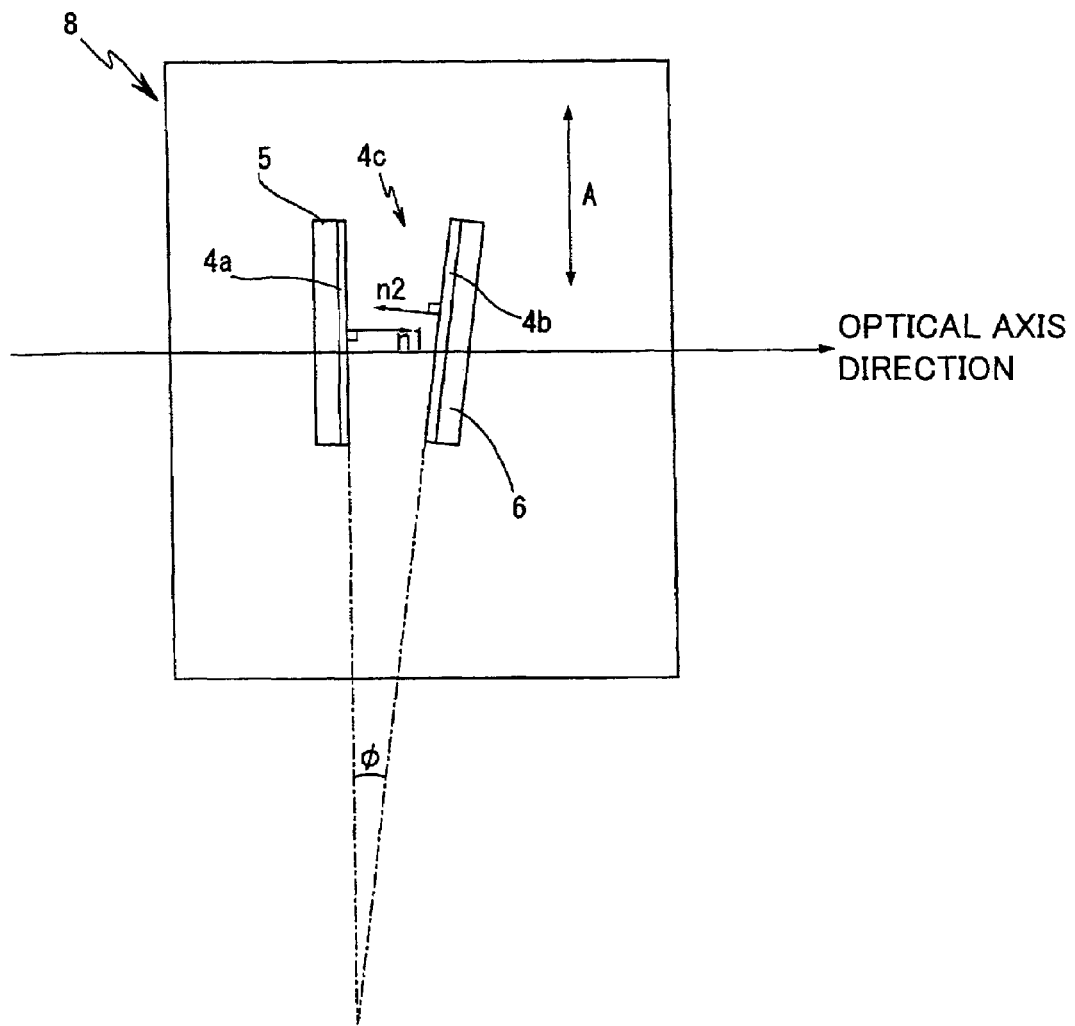
FIG. 5 is an explanatory drawing showing selection of an operating point through moving a resonator on an optical base.

FIG. 5 is a schematic drawing for explaining a configuration in which the resonator is shifted.

The substrate 5 of the laser medium and the substrate 6 of the saturable absorber are arranged on a base of the optical system so as to be movable thereon. Although other possible configuration may be such as allowing a supporting member having the substrates mounted thereon to move on the base, the drawing depicts the substrates 5, 6 are moved on the base 8 for simplicity. It is also to be understood that, although the individual substrates are expressed in a separated manner, they are actually moved together because they are integrated as described in the above.

Both of reference symbols "n1", "n2" in the drawing indicate normal vectors, where "n1" indicates a normal vector stands on the interface between the laser medium and intermediate medium, and "n2" indicates a normal vector stands on the interface between the saturable absorber and intermediate medium.

The "base surface" of the optical system is a plane in parallel with the sheet of FIG. 5.

A symbol "φ" is an angle between the interface on which the normal vector n1 stands and the interface on which the normal vector n2 stands, which expresses a relative inclination between the both (a larger φ value corresponds to a larger variation ΔL in the light path length in relation to the amount of shifting).

In the adjustment of the light path length L, both substrates 5, 6 are moved on the base 8 along the direction (indicated by the arrow "A") normal to the optical axis of the excitation light. The adjustment is simple because the only requirement is to keep an approximately parallel relation of the planes including ni and n2 with respect to the base surface. More specifically, a vector product of the normal vectors ni and n2 points in the direction orthogonal to, or approximately normal to the base surface, so that movement of both substrates in this direction will not vary the light path length L. Of course it is allowable to obliquely move both substrates to a direction inclined by a certain angle from the direction of the vector product (variation □L in the light path length with respect to the amount of movement will be reduced), this may complicate the adjustment mechanism and needs further consideration on a method of positional fixation after the adjustment.

The above-described method (2) refers to a method in which the optical axis of the excitation light is shifted while keeping the position of the resonator fixed, where possible methods include such as moving it with respect to either one of the excitation light source 2 and optical system 3, and such as moving it with respect to the excitation light source 2 and optical system 3. For the case where the optical system 3 is moved, possible methods include such as moving the entire portion thereof, or such as moving only some constituents such as a convergent lens.

As for the above-described method (3), possible methods include allocating the methods (1) and (2) to rough adjustment and fine adjustment, for example, and applying the methods (1) and (2) in a time-divisional manner.

In short, the light path length of the resonator can be adjusted by changing the relative positional relation between the excitation light source 2 or optical system 3, and the solid-state laser resonator.

The orbital length with respect to the solid-state laser resonator in this case is preferably 5 mm (millimeters) or shorter. This value is based on the oscillation limit of the resonator using the thermal lens effect.

Of the aforementioned constituents of the solid-state laser resonator, those having a plane inclined from a plane orthogonal to the optical axis of the excitation light preferably have an angle of the inclination of 0.07 milliradians or larger and 2 milliradians or smaller.

Similarly for the case where the thickness of the intermediate medium (air layer, etc.) in the direction parallel to the optical axis of the excitation light is specified so as to vary along the direction orthogonal to the optical axis, it is preferable that the interface between the intermediate medium and the laser medium or saturable absorber inclines from a plane orthogonal to the optical axis of the excitation light by an angle of inclination of 0.07 milliradians or larger and 2 milliradians or smaller.

An angle of inclination of 0.07 milliradians (lower limit value) is a result of limitation in view of the element size. Assuming now the chip size as D-mm square, any resonator length is adjustable if the inclination of the interface of the constituents in the resonator is successful in obtaining difference in the light path length of as long as half or more of the output wavelength ($\lambda$), so that an angle $\theta$ of the inclination will be calculated. More specifically, an inequality of [$\tan \theta \geq \lambda/(2 \cdot D)$] using tangential function (tan) can be given as [$\theta \geq \lambda/(2 \cdot D)$] using a linear approximation of [$\tan \theta \approx \theta$]. Assuming now a chip size as 5 mm×5 mm, and a minimum wavelength as 700 nm, $\lambda/2=0.35$ μm holds, and the calculation gives [0.35 μm/5 mm=0.07 mrad]. The angle of inclination of the interface of the constituents in the resonator is therefore preferably 0.07 mrad or larger.

An angle of inclination of 2 milliradians (upper limit value) is a result of limitation in view of the characteristics (lateral mode generation of the laser, power reduction). In a type of laser of which resonator is formed by a thermal lens for example, it is calculated that an approximately 1-W excitation can produce, within the laser medium (Nd:YVO$_4$), a thermal lens having a focal length of f=5 mm or around. A resonator length of approximately 0.5 mm results in a mode diameter of approximately 50 μm. Assuming that a 20% displacement of the mode diameter, or a 10 μm displacement, occurred between the excitation light and oscillation mode results in generation of the lateral mode or reduction in power, it is necessary to define the upper limit as 2 mrad or smaller.

With respect to the light path length L of the resonator of the solid-state laser resonator, variation $\Delta L$ in the light path length defined depending on selection of the position of excitation is preferably adjusted to half of the laser oscillation wavelength $\lambda$ (that is, [$\Delta L \geq \lambda/2$]). This provides a condition for locating the laser oscillation wavelength always at around the center wavelength of the gain, because the vertical mode of the resonator repetitively appears for every resonator length of $\lambda/2$ at around the laser oscillation frequency, and is required for selecting a stable operating point.

Figure 9:
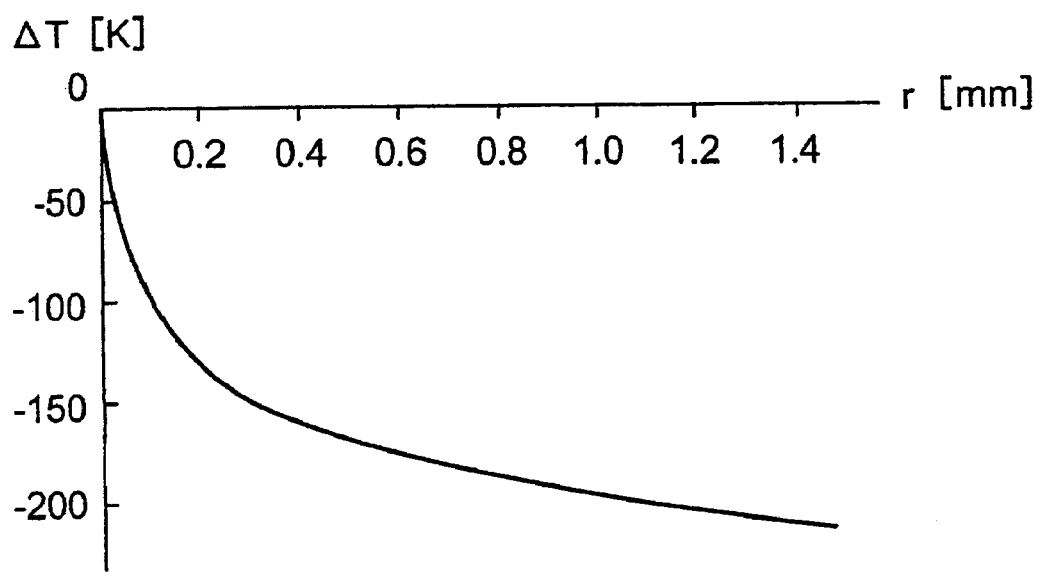
FIG. 9 is a graph showing an exemplary relative temperature distribution assuming the excitation center as a reference position.
Figure 10:
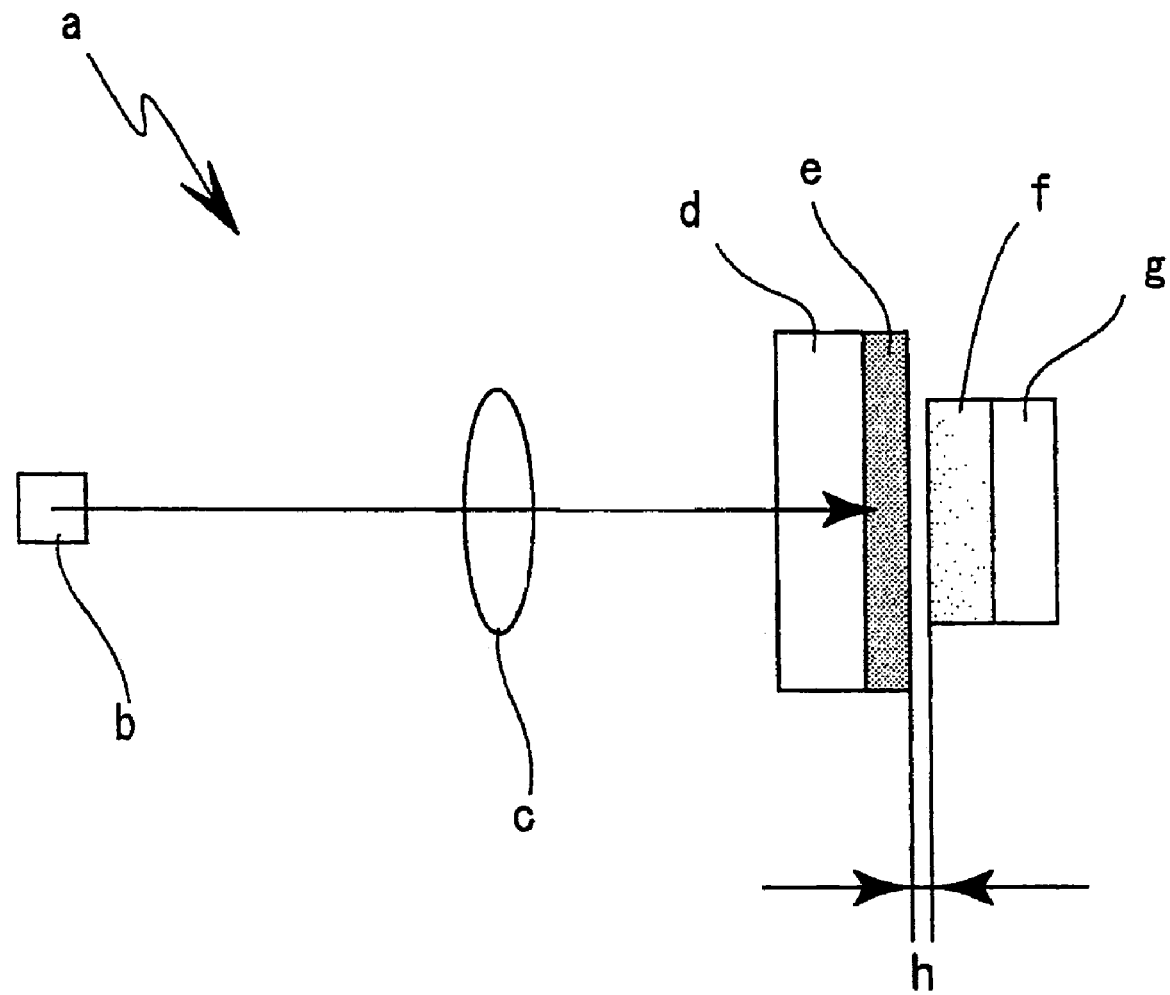
FIG. 10 is a drawing of an exemplary configuration of a conventional laser light generating device.

While adjustment of the light path length of the resonator described in the above ignored influences of temperature, temperature distribution changes as much as 200K actually generates in the radial direction assuming the excitation center as a reference position as shown in FIG. 9, and a problem of influence of heat will arise.

It is therefore preferable, in view of reducing the thermal stress, that values of thermal expansion coefficient of the substrates 5, 6 are close to those of the laser medium and saturable absorber. For example, it is preferable to design the device so that difference in the thermal expansion coefficients between the laser medium 4a and substrate 5, or difference in the thermal expansion coefficients between the saturable absorber 4b and substrate 6 falls within a range of ±5×10$^{-6}$/K. This allowable range is considered as preferable in a practical use, so that a material for the substrate should be selected so that difference in the thermal expansion coefficient with respect to the laser medium and saturable absorber does not exceed this range. This type of laser is repetitively subjected to temperature change between normal temperature and 200° C. or around when switched between ON and OFF. If the difference in the thermal expansion coefficient of two substances bonded with each other is suppressed within a range of ±5×10$^{-6}$/K, temperature change of approximately 200° C. is only causative of a maximum of 0.1% elongation or shortening, and this is successful in suppressing stress-induced fracture or deterioration.

As for the substrate 5 and substrate 6, values of the heat transfer coefficient are preferably 150 [W/(m·K)] or larger. This is necessary to make the device less susceptible to temperature change. More specifically, this is because a low heat dissipation will undesirably elevate temperature of the laser medium and saturable absorber, and will adversely affect the characteristics and lifetime. It is to be understood that a value of 150 [W/(m·K)] or larger represents a condition such that heat of approximately 1.5 W conducts through a section of 1 mm×5 mm over 5-mm length and causes temperature difference of 10° C. or less. The above-described value is therefore estimated as a necessary heat transfer coefficient which is calculated based on a practical element size and heating amount, assuming an allowable limit of further temperature rise of 10° C. due to the substrate.

The exemplary case shown in FIG. 2 and FIG. 3 is designed to allow heat of the laser medium 4a to be dissipated through the substrate 5 and substrate 6, and to reduce thermal influence from the laser medium to other portions by virtue of interposition of the intermediate medium 4c. For the case where the laser medium 4a and saturable absorber 4b are held using a member such as substrate, it is effective to attach and fix the laser medium 4a and saturable absorber 4b on the different surfaces as viewed from the direction of the optical axis.

In this example, a part of the substrate 6 and the laser medium 4a are fixed using an adhesive, and the saturable absorber 4b is fixed to the recess 6a of the substrate 6 using an adhesive, which is intended for suppressing variation in the resonator length ascribable to thermal expansion of the adhesive (generally having a large thermal expansion coefficient). More specifically, the direction of thermal expansion of an adhesive for bonding the laser medium 4a and substrate 6 in relation to the temperature change (see the arrow in the portion β in FIG. 3), and the direction of thermal expansion of an adhesive for bonding the saturable absorber 4b and the substrate 6 in relation to the temperature change (see the arrow in the portion a in FIG. 3) are oriented to the same direction. For the case where the individual adhesives have nearly equal amount of thermal expansion, variation in the resonator length ascribable to the individual amount of expansion can almost be cancelled. Even for the case where the individual adhesives differ in the amount of thermal expansion, the difference in the resonator length can be reduced (variation in the resonator length is in proportion to difference in the amount of thermal expansion).

The conventional method by which an operating point is selected based on a full use of the temperature change is no more available if variation in the resonator length in relation to the temperature change becomes small, but a stable operating point can be selected by adding variation in the light path length L in the direction orthogonal to the optical axis, rather than keeping the light path length L of the resonator at constant, and by adjusting the light path length corresponding to variation in the position of excitation (in other words, the resonator adopts the wedge-formed structure because the adoption of the configuration for reducing influences of the temperature change inevitably requires a configuration for adjusting the resonator length through a technique other than temperature control).

Next, the above-described mode (II) will be described.

Figure 6:
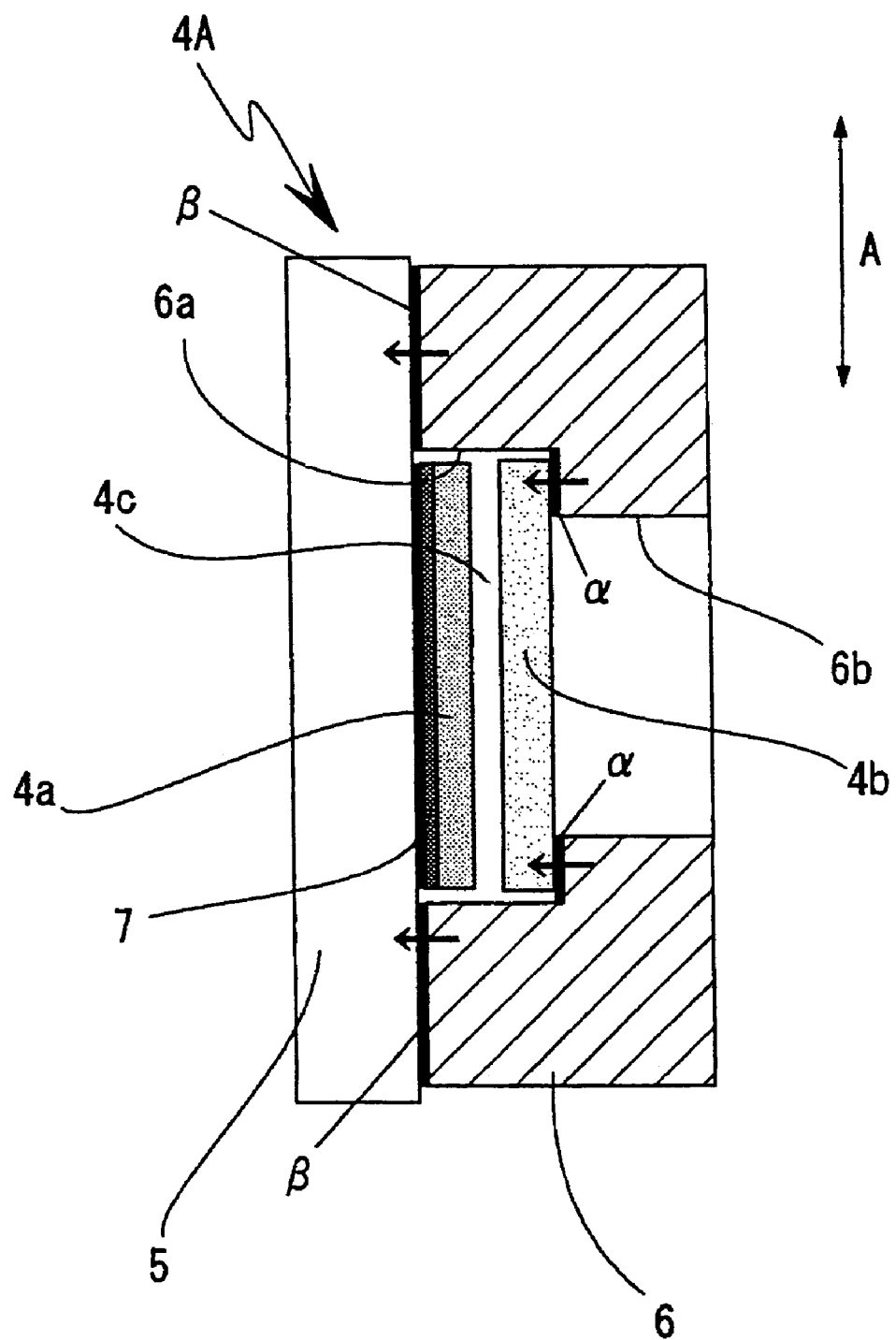
FIG. 6 is a drawing of another exemplary configuration of a solid-state laser resonator.

FIG. 6 is a drawing of an exemplary configuration according to mode (II), where a sectional structure of the resonator is shown.

In the solid-state laser resonator 4A shown in this example, the laser medium 4a is not adhered to the substrate 6, but a portion of the substrate 5 having no laser medium 4a formed thereon is adhered to the substrate 6. Because the laser medium 4a is not adhered to the substrate 6, there is no fear of thermal stress exerted on the laser medium 4a in the adhered portion therebetween.

The laser medium 4a is adhered to the substrate 5 on the side having the mirror formed thereon, and is housed in the recess 6a after the substrate 5 and substrate 6 are bonded. The saturable absorber 4b is fixed to the stepped portion on the bottom of the recess 6a using an adhesive, similarly to as shown in FIG. 3.

The resonator has a wedge-formed structure by providing inclination of the planes or variation in the thickness of the constituents thereof, so that the operating point can be selected by adjusting the light path length L of the resonator through shifting of the excitation optical system or resonator in the direction indicated by arrow "A", with respect to a relative positional relation between the optical axis of the excitation light and resonator.

Because the direction of thermal expansion of the adhesive for bonding the laser medium 4a to the substrate 5 in this example is oriented to the direction opposite to that of the thermal expansion of the adhesive for bonding the saturable absorber 4b to the substrate 6, a positional relation capable of canceling variation in the resonator length due to thermal expansion is not established (variation will occur in the direction of reducing the resonator length). The variation in the resonator length can, however, be nearly canceled when the individual adhesives have nearly equal amount of thermal expansion, because the direction of thermal expansion of the adhesive for fixing the substrate 5 to the substrate 6, and the direction of thermal expansion of the adhesive for fixing the saturable absorber 4b to the substrate 6 are oriented to the same direction (even for the case where the individual adhesives differ in the amount of thermal expansion, the difference in the resonator length can be reduced).

Figure 7:
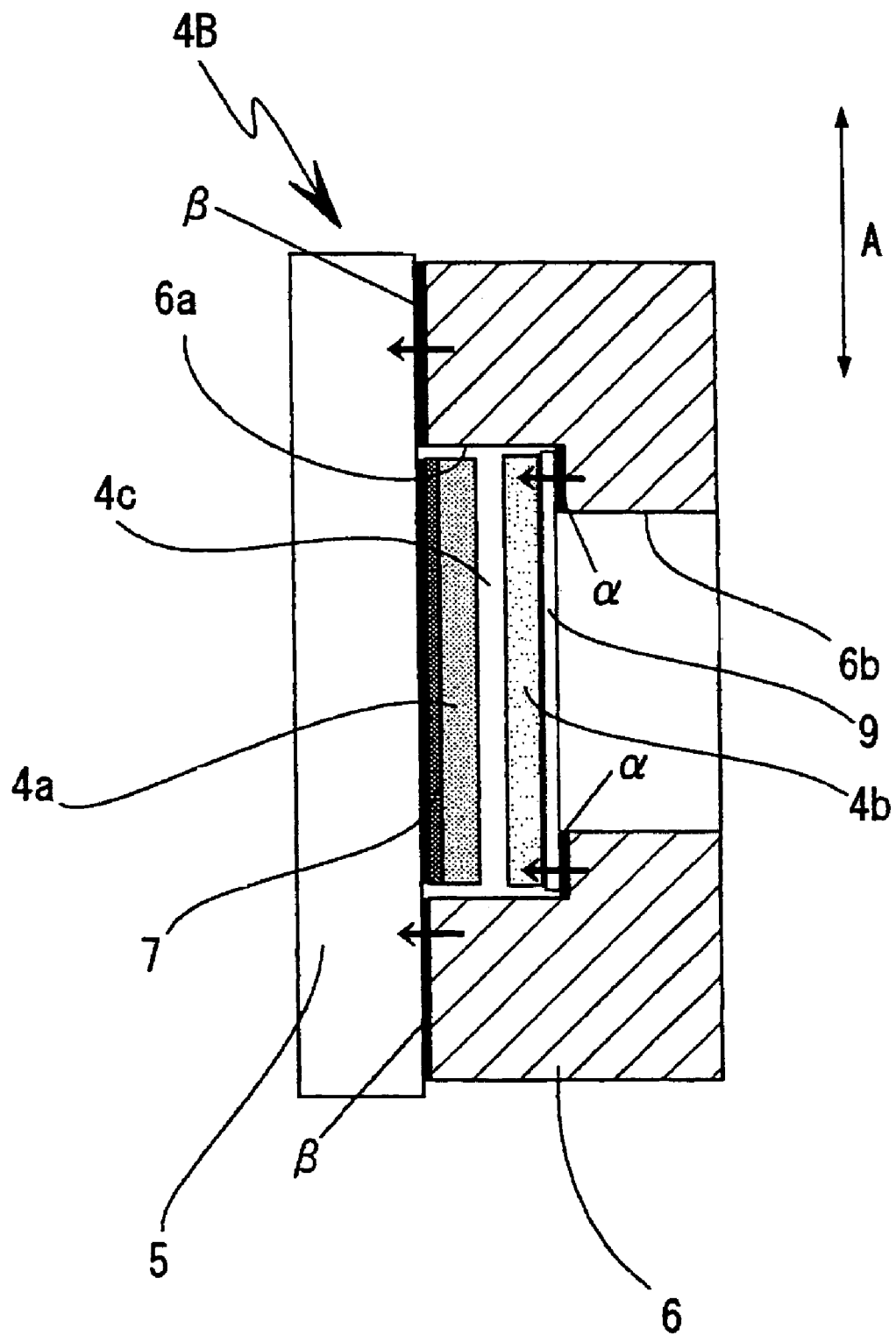
FIG. 7 is a drawing of still another exemplary configuration of a solid-state laser resonator.

FIG. 7 is a drawing of another exemplary configuration according to mode (II), where a sectional structure of the resonator is shown.

Differences from the configuration shown in FIG. 6 relate to that the saturable absorber 4b is fixed on a small substrate 9, and the small substrate is fixed by adhesion to the stepped portion formed in the recess 6a of the substrate 6.

The solid-state laser resonator 4B shown in this example has an advantage of causing only a small thermal stress because the saturable absorber 4b is not directly fixed to the substrate 6. Thermal stress exerted to the saturable absorber 4b or the like can be prevented from excessively increasing, if the small substrate 9 has a small size and is composed of a material having a good heat conduction property.

The resonator has a wedge-formed structure by providing inclination of the planes or variation in the thickness of the constituents thereof, so that the operating point can be selected by adjusting the light path length L of the resonator through shifting of the excitation optical system or resonator in the direction indicated by arrow "A", with respect to a relative positional relation between the optical axis of the excitation light and resonator.

Because the direction of thermal expansion of an adhesive for bonding the substrate 5 and substrate 6, and the direction of thermal expansion of an adhesive for bonding the small substrate 9 and substrate 6 are oriented to the same direction, changes in the resonator length ascribable to the individual amount of expansion can almost be cancelled if the individual adhesives have nearly equal amount of thermal expansion (or the difference in the resonator length can be reduced even when the individual adhesives differ in the amount of thermal expansion).

Lastly, a method of fabricating the laser light generation device will be described.

Major process steps are as follows:
(i) step of fabricating the solid-state laser resonator; and
(ii) step of carrying out alignment of the excitation optical system with the solid-state laser resonator, and adjustment of light path length L of the resonator.

First in step (i), the substrate individually having, as being mounted thereon, the laser medium and saturable absorber, which are constituents of the solid-state laser resonator (assembly), are bonded with each other. The laser medium and saturable absorber are thus arranged while placing the intermediate medium in between, and as described in the above, the constituents of the resonator are configured so as to have a plane inclined from a plane orthogonal to the optical axis of the excitation light, or so as to have a thickness in the direction parallel to the optical axis of the excitation light varied in the direction orthogonal to the optical axis.

In step (ii), the excitation optical system including the excitation light source 2 and optical system 3, and the solid-state laser resonator fabricated in step (i) are optically aligned. In this process, a stable operating point is selected by varying the position of excitation in the direction orthogonal to the optical axis of the excitation light, and by adjusting the light path length of the resonator corresponding to the variation with an accuracy equivalent to or smaller than the laser oscillation wavelength (this is successful in obtaining desired characteristics with a desirable stability).

For this purpose, the following methods will be used:

(1) a light detection means (photo-detector, etc.) is disposed in order to monitor the laser power or pulse recurrence frequency;

(2) the position of excitation of the resonator is gradually varied while monitoring detection signals from the light detection means; and.

(3) the adjustment is terminated when the power or pulse recurrence frequency reaches a target value or a maximum value, or falls within an allowable range containing the target value or the maximum value, but the adjustment is returned to step (2) and continued if not.

There are various possible modes for varying relative positional relation between the excitation optical system and solid-state laser resonator as described in the above, one exemplary method is to move the solid-state laser resonator on the base of the optical system as described referring to FIG. 5 (a simple configuration is that the resonator including the laser medium and saturable absorber is moved on the base surface in the direction parallel to the base surface).

The above-described configuration yields the following advantages:

nonconformities ascribable to vibration (increase in pulse jitter, etc.) can be suppressed by adopting a configuration in which the resonator as a sub-assembly is fixed on the integrated substrate;

vibration resistance is improved by adopting a configuration in which the light path length of the resonator is less susceptible to long-term changes, and this makes it less causative of shifting or fluctuation of the operating point during long-term operation; and adoption of the resonator having a wedge-formed structure makes it possible to readily select an operating point and to fabricate the device, without needing a high accuracy equivalent to or smaller than the wavelength during the assembly.

INDUSTRIAL APPLICABILITY

As is clear from the above description, according to one or more embodiment(s) of the invention, the light path length of the resonator is less susceptible to vibration and time-dependent changes, which ensures operational stability (less in pulse jitter, for example). In addition, adjustment of the resonator light path length by varying the position of excitation within the laser medium makes it possible to select a operating point which is stable in terms of characteristics, and makes it no more necessary to use a method of selecting the operating point based on temperature changes. This consequently makes it possible to reduce variation in the resonator length caused by temperature changes (or to adopt a structure less susceptible to heat).

One or more embodiment(s) of the invention can ensure stable operation when applied to passive Q-switched laser.

One or more embodiment(s) of the invention is/are successful in radiating the excitation light through an optical system to irradiate a target position.

One or more embodiment(s) of the invention is/are successful in obtaining a laser light within an output wavelength range of the solid-state laser.

One or more embodiment(s) of the invention is/are successful in raising the reliability of the oscillating operation for the case where the resonator is formed using the thermal lens effect within the laser medium.

One or more embodiment(s) of the invention is/are advantageous in downsizing the device.

One or more embodiment(s) of the invention makes it possible to configure the resonator using materials of a relatively good availability, needing no materials produced by special methods or no expensive materials.

One or more embodiment(s) of the invention is/are successful in ensuring a resonator length necessary for the adjustment, and in excluding nonconformities ascribable to generation of lateral mode of the laser and reduction in the output.

One or more embodiment(s) of the invention is/are successful in facilitating the fabrication, and in simplifying the configuration.

One or more embodiment(s) of the invention is/are successful in adjusting the light path length of the resonator, and in simplifying the configuration for the adjustment.

One or more embodiment(s) of the invention is/are successful in reducing influences of thermal stress.

One or more embodiment(s) of the invention is/are successful in raising the heat dissipation performance.

One or more embodiment(s) of the invention is/are successful in suppressing variation in the resonator length due to thermal expansion.

One or more embodiment(s) of the invention is/are successful in adjusting the resonator light path length with a high accuracy.

One or more embodiment(s) of the invention is/are successful in simplifying the method of adjusting the resonator light path length, needing no complicated adjustment mechanism.

The invention claimed is:

1. A laser light generating device comprising an excitation light source for generating a continuous-wave excitation light and a solid-state laser resonator based on using thermal lens effect available at a position of excitation in a laser medium, characterized in that:

said solid-state laser resonator is configured so that individual substrates having individual constituents of said solid-state laser resonator disposed thereon are integrated by bonding, and so that reflection means or a saturable absorber of said solid-state laser resonator is opposed to said laser medium while placing an intermediate medium in between;

said constituent of said solid-state laser resonator has an interface inclined from a plane orthogonal to an optical axis of said excitation light, and a light path length of said solid-state resonator in a direction parallel to an optical axis of said excitation light differs depending on setting of said position of excitation; and characterized by having an output wavelength of 700 nm or longer, and 1,600 nm or shorter.

2. The laser light generating device as claimed in claim 1, characterized in that:

said solid-state laser resonator has, as constituents thereof, a laser medium capable of absorbing said excitation light, a saturable absorber, an intermediate medium disposed on a light path between said laser medium and said saturable absorber, and reflection means for composing said resonator;

said substrate having said laser medium disposed thereon and said substrate having said saturable absorber disposed thereon are integrated by bonding so as to have a structure in which said laser medium and said saturable absorber are opposed while placing said intermediate medium in between; and either one or a plurality of said constituents of said solid-state laser resonator have interfaces inclined from a plane orthogonal to an optical axis of said excitation light, or a thickness of said laser medium or saturable absorber or intermediate medium in a direction parallel to an optical axis of said excitation light varies in the direction orthogonal to said optical axis, so as to define a light path length of said resonator depending on a position of excitation in a direction orthogonal to said optical axis of said excitation light.

3. The laser light generating device as claimed in claim 1, characterized by comprising an approximately equal-magnification or reduced-magnification optical system disposed between said excitation light source and said solid-state laser resonator.

4. The laser light generating device as claimed in claim 1, characterized in that an orbital length with respect to said solid-state laser resonator is 5 mm or shorter.

5. The laser light generating device as claimed in claim 2, characterized by using a semiconductor saturable absorber.

6. The laser light generating device as claimed in claim 1, characterized by using a rare-earth-element-doped solid laser medium.

7. The laser light generating device as claimed in claim 6, characterized by using Nd-doped $YVO_4$ as said solid laser medium.

8. The laser light generating device as claimed in claim 1, characterized in that any constituent having an interface inclined from a plane orthogonal to an optical axis of said excitation light, out of all constituents of said solid-state laser resonator, has an angle of inclination from said plane of 0.07 milliradians or larger and 2 milliradians or smaller.

9. The laser light generating device as claimed in claim 1, characterized by using a gas layer having a refractive index of approximately 1 as said intermediate medium.

10. The laser light generating device as claimed in claim 9, characterized by using an air layer as said intermediate medium.

11. The laser light generating device as claimed in claim 1, characterized in that:
a thickness of said intermediate medium in a direction parallel to an optical axis of said excitation light varies along in a direction orthogonal to said optical axis; and
an interfacial plane between said intermediate medium and said laser medium or said saturable absorber is inclined from a plane orthogonal to an optical axis of said excitation light by an angle of 0.07 milliradians or larger and 2 milliradians or smaller.

12. The laser light generating device as claimed in claim 1, characterized in that, with respect to said resonator light path length of said solid-state laser resonator, change in said light path length defined depending on said position of excitation is a half or more of a laser oscillation wavelength.

13. The laser light generating device as claimed in claim 2, characterized in that said substrate having said laser medium disposed thereon and said substrate having said saturable absorber disposed thereon are arranged on a base of an optical system; and
in that said laser medium and saturable absorber are configured as being movable on a base plane of said optical system in such a way that a plane which contains a normal line of an interface between said laser medium and said intermediate medium, and a normal line of an interface between said saturable absorber and said intermediate medium, is oriented approximately in parallel with said base plane of said optical system.

14. The laser light generating device as claimed in claim 1, characterized in that a difference of thermal expansion coefficient between said laser medium and its correspondent substrate, or a difference of thermal expansion coefficient between said saturable absorber and its correspondent substrate falls within a range of±5 ×10$^{-6}$[/K].

15. The laser light generating device as claimed in claim 1, characterized in that said substrate of said laser medium or said substrate of said saturable absorber has a value of heat transfer coefficient of 150[W/(m☐K)] or larger.

16. The laser light generating device as claimed in claim 2, characterized in that a direction of thermal expansion of an adhesive for bonding said substrates of said laser medium and said saturable absorber and a direction of thermal expansion of an adhesive for bonding said substrates of said saturable absorber with its correspondent substrate are oriented to a same direction.

17. A method of fabricating a laser light generating device which comprises an excitation light source for generating a continuous-wave excitation light and a solid-state laser resonator based on using thermal lens effect available at a position of excitation in a laser medium;
characterized in that substrates having individual constituents of said solid-state laser resonator disposed thereon are bonded, and that said laser medium and a reflection means or a saturable absorber of said resonator are arranged while placing an intermediate medium in between; and
in that any of said constituent of said solid-state laser resonator is formed so as to have an interface inclined from a plane orthogonal to an optical axis of said excitation light, to thereby vary said position of excitation in a direction orthogonal to an optical axis of said excitation light, and that a light path length of said resonator is adjusted with an accuracy equivalent to or smaller than a laser oscillation wavelength depending on said variation.

18. The method of fabricating a laser light generating device as claimed in claim 17, characterized in that:
the substrates respectively having said laser medium and said saturable absorber, which configure said solid-state laser resonator, disposed thereon are bonded, and that said intermediate medium is disposed between said laser medium and said saturable absorber; and
an interface inclined from a plane orthogonal to an optical axis of said excitation light is formed on said laser medium, or on its correspondent substrate, or on said saturable absorber, or on its correspondent substrate, or on reflection means for configuring said solid-state laser resonator; or a thickness of said laser medium or of said saturable absorber or of said intermediate medium in a direction parallel to an optical axis of said excitation light is varied in a direction orthogonal to an optical axis of said excitation light; to thereby vary said position of excitation in a direction orthogonal to an optical axis of said excitation light, and that said light path length of said resonator is adjusted with an accuracy equivalent to or smaller than the laser oscillation wavelength depending on said variation.

19. The method of fabricating a laser light generating device as claimed in claim 17, characterized in that:
said position of excitation is varied in a direction orthogonal to an optical axis of said excitation light while monitoring changes in output power or a pulse recurrence frequency of said laser light generating device, and the adjustment of said light path length of said resonator is terminated when said power or pulse recurrence frequency reaches a target value or a maximum value, or falls within an allowable range containing said target value or said maximum value.

20. The method of fabricating a laser light generating device as claimed in claim 17, characterized in that said light path length of said resonator is adjusted by varying said position of excitation through varying relative positional relation between an optical system disposed between said excitation light source and said solid-state laser resonator, and said solid-state laser resonator.

21. The method of fabricating a laser light generating device as claimed in claim 17, characterized in that said resonator light path length of said solid-state laser resonator is varied by a half or more of said laser oscillation wavelength by varying said position of excitation.

22. The method of fabricating a laser light generating device as claimed in claim 21, characterized in that a thickness of said intermediate medium in a direction parallel to an optical axis of said excitation light is varied in a direction orthogonal to an optical axis of said excitation light, to thereby incline an interface between said intermediate medium and said laser medium or saturable absorber from a plane orthogonal to an optical axis of said excitation light, while defining an angle of inclination as 0.07 milliradians or larger and 2 milliradians or smaller.

23. The method of fabricating a laser light generating device as claimed in claim 18, characterized in that:
said substrate having said laser medium disposed thereon and said substrate having said saturable absorber disposed thereon are arranged on a base of an optical system; and
said solid-state laser resonator containing both of said substrates is moved while keeping a plane which contains a normal line of said plane inclined from said plane orthogonal to an optical axis of said excitation light approximately in parallel with said base plane of said optical system.

24. The method of fabricating a laser light generating device as claimed in claim 18, characterized in that said saturable absorber is fixed by adhesion to said correspondent substrate, and said laser medium is fixed by adhesion to said substrate having said saturable absorber fixed thereon, so as to orient a direction of thermal expansion of an adhesive for bonding said laser medium to said substrates of said saturable absorber and a direction of thermal expansion of an adhesive for bonding said saturable absorber to said correspondent substrate to a same direction.

25. A laser light generating device comprising an excitation light source for generating a continuous-wave excitation light and a solid-state laser resonator based on using thermal lens effect available at a position of excitation in a laser medium,
characterized in that:
said solid-state laser resonator is configured so that individual substrates having individual constituents of said solid-state laser resonator disposed thereon are integrated by bonding, and so that reflection means or a saturable absorber of said solid-state laser resonator is opposed to said laser medium while placing an intermediate medium in between;
said constituent of said solid-state laser resonator has an interface inclined from a plane orthogonal to an optical axis of said excitation light, and a light path length of said solid-state resonator in a direction parallel to an optical axis of said excitation light differs depending on setting of said position of excitation; and
a difference of thermal expansion coefficient between said laser medium and its correspondent substrate, or a difference of thermal expansion coefficient between said saturable absorber and its correspondent substrate falls within a range of $\pm 5\times 10^{-6}$ [/K].

26. A laser light generating device comprising an excitation light source for generating a continuous-wave excitation light and a solid-state laser resonator based on using thermal lens effect available at a position of excitation in a laser medium,
characterized in that:
said solid-state laser resonator is configured so that individual substrates having individual constituents of said solid-state laser resonator disposed thereon are integrated by bonding, and so that reflection means or a saturable absorber of said solid-state laser resonator is opposed to said laser medium while placing an intermediate medium in between;
said constituent of said solid-state laser resonator has an interface inclined from a plane orthogonal to an optical axis of said excitation light, and a light path length of said solid-state resonator in a direction parallel to an optical axis of said excitation light differs depending on setting of said position of excitation; and
said substrate of said laser medium or said substrate of said saturable absorber has a value of heat transfer coefficient of 150[W/(m□K)] or larger.

* * * * *